United States Patent Office 3,356,577
Patented Dec. 5, 1967

3,356,577
APPARATUS FOR DETERMINING THE INSTANTANEOUS OUTPUT OF A NUCLEAR REACTOR
Ygal Fishman, Halden, Norway, assignor to Sulzer Brothers, Limited, Winterthur, Switzerland, a corporation of Switzerland
Filed Sept. 16, 1964, Ser. No. 396,901
Claims priority, application Switzerland, Sept. 19, 1963, 11,561/63
5 Claims. (Cl. 176—20)

The present invention relates to a method of and an apparatus for determining the instantaneous output of a nuclear reactor for control purposes whereby the neutron flux is measured at a location in the reactor.

In control systems for nuclear reactors, neutron flux measurement is often used as a measure of the instantaneous output of the reactor. The advantage of neutron flux measurement for this purpose is that it responds quickly to changes in output; however, it does not accurately represent the true output of the reactor, since, being an individual measurement, it does not give an accurate overall picture of the entire neutron flux.

It is also known to determine reactor output from the difference between the energy of the coolant supplied to the reactor and the coolant issuing therefrom. This determination is very sluggish since the reactor has considerable heat storage capacity.

It is an object of the present invention to provide a method of and means for measuring the instantaneous output of a nuclear reactor which combines the advantages of the aforedescribed conventional methods and avoids the disadvantages connected with these conventional methods.

In the method according to the invention, a signal dependent upon the reactor output is produced by multiplication of a signal representing the measured neutron flux at a location in the reactor by a signal dependent upon the heat output of the reactor.

The apparatus for practicing the method according to the invention comprises means for measuring the neutron flux, means for measuring the thermal output of the reactor, and multiplying means to which the signals delivered by the neutron-flux-measuring means and the thermal-output-measuring means are supplied.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Figure 1:
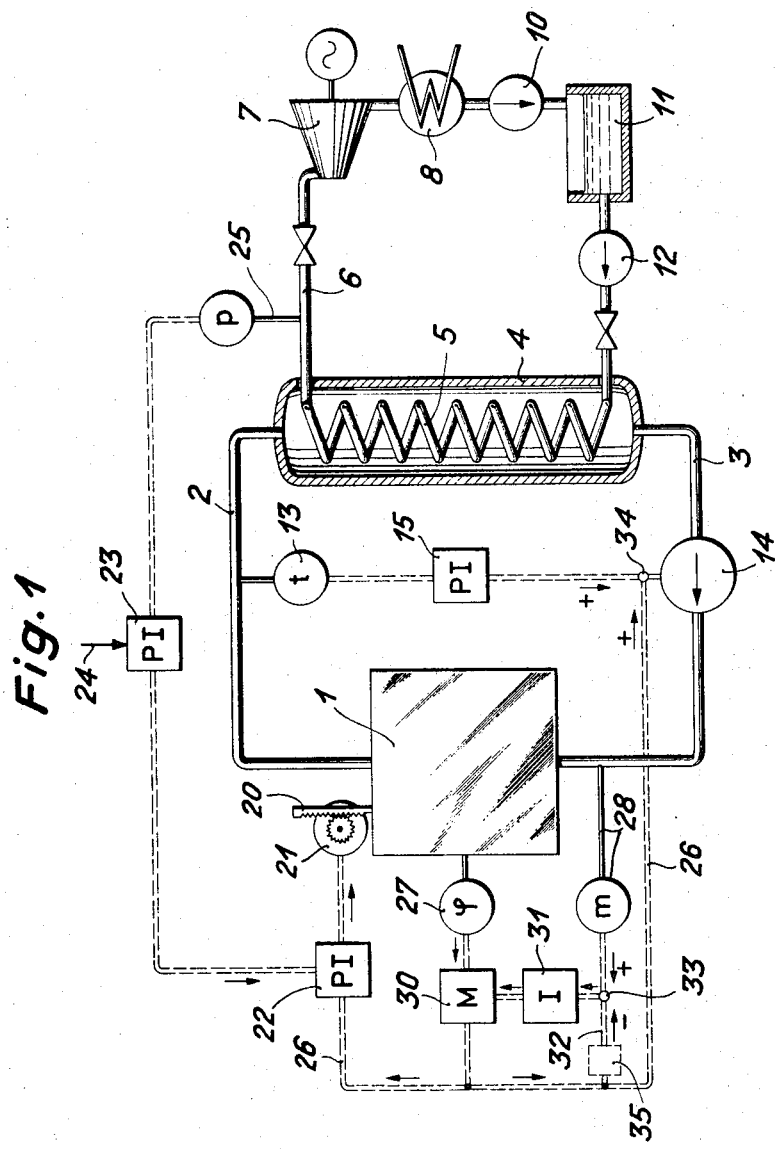
FIG. 1 is a diagrammatic, part-sectional illustration of a nuclear reactor steam power plant provided with an output control system including measuring means according to the invention.

Referring to FIG. 1, a reactor 1 is connected to a coolant circuit formed by conduits 2 and 3 between which a heat exchanger 4 is arranged. An operating medium, for example water, is evaporated and superheated in tubes 5 in the heat exchanger 4, only one tube 5 being shown. The superheated vapor flows through a pipe 6 to a turbine 7 and thence to a condenser 8 wherefrom the condensate is removed by a condensate pump 10 for delivery to a feed tank 11. A feed pump 12 returns the liquid operating medium to the tubes 5. The circuit of the reactor coolant which may be, for instance, a gas, is provided with a temperature-measuring element 13 connected to the conduit 2 and a coolant-circulating device 14 interposed in the conduit 3. The signal delivered by the element 13 acts on a controller 15 which controls the device 14 for regulating the rate of coolant circulation in response to temperature measured by the element 13. The means for controlling the device 14 preferably are so constructed and arranged as to effect a stepless control. The temperature at which the coolant leaves the reactor is therefore maintained by variation of the rate of coolant circulation. Since the heat exchanger 4 has a large heat-exchange surface— as is usually the case in nuclear reactor plants of the described type—the temperature at which the cooled coolant leaves the heat exchanger 4 is substantially constant and is close to the temperature of the operating medium entering the heat exchanger. Since the pressure of the coolant in the coolant circuit is also constant, the rate of coolant circulation is a sufficiently accurate indication of the heat removed from the reactor by the coolant.

The reactor output is adjusted in known manner by moving control rods 20, of which only one is shown, by a servomotor 21 controlled by a controller 22 receiving its reference input from a superordinal controller 23. A set-value signal 24 corresponding to the required output of the plant, and an actual-value signal produced by a pressure-measuring device 25 connected to the pipe 6, act on the controller 23 which compares these two signals and transmits a signal corresponding to the result of the comparison as a set-point signal to the controller 22. The latter compares the set-value signal from the controller 23 with a signal delivered via a signal conduit 26 and representing the instantaneous reactor output and adjusts the position of the rods 20 correspondingly.

The instantaneous-output signal from the conduit 26 is produced by a combination of actual-value signals from a neutron-flux-measuring device 27 and from a device 28 for measuring the rate of circulation of the coolant in the conduit 3. The signal delivered by the neutron-flux-measuring device 27 is supplied to a multiplying element 30 which also receives, via an integrating device 31, a signal from a comparator 33. The output signal delivered by the multiplying device 30 acts via the conduit 26 and via a signal conduit 32 connected thereto on the comparator 33 disposed between the devices 28 and 31. The comparator 33 compares the signal from the device 28 with the signal in the conduit 26 and transmits to the integrating device 31 a signal corresponding to the difference between the two last mentioned signals. The signal in the conduit 26 can also be superimposed in an adding device 34 on the signal which the controller 15 supplies to the circulating device 14.

The multiplaction according to the invention of the signal corresponding to the neutron flux by the signal corresponding to the difference between the coolant-circulation rate and the signal resulting from said multiplication is a simple way of combining the accurate but sluggish measured value of the thermal output with the measured neutron flux which, although reacting rapidly, is not in a linear relation to the thermal output. The feedback via the conduit 32 effects a fundamental influence of the output signal of the device 28 on the output-value signal in the conduit 26. The signal from the neutron-flux-measuring device 27 speeds up the response rate of the control at abrupt changes in reactor output. Heterodyning the signal from the conduit 26 in the adding device 34 with the signal from the controller 15 also helps to improve the constancy of the reactor output temperature.

The multiplying element can be, for instance, if electric, a potentiometer having connected to its fixed contacts a signal conduit, for example the conduit from the neutron-flux-measuring device. In this case the moving contact is actuated by a servomotor which, in the embodiment according to FIG. 1, is actuated according to the voltage difference at 33. The voltage at the movable contact is the signal which is to be transmitted to the controller 22.

Operation of the arrangement according to the invention may be improved by providing a delaying device 35 in the signal conduit 32. This retards the effect of disturbances in the neutron flux on the control system whereby control oscillations caused by said disturbances are reduced. Optimum conditions are obtained if the delaying device has the same compensating effect as the reactor.

Figure 2:
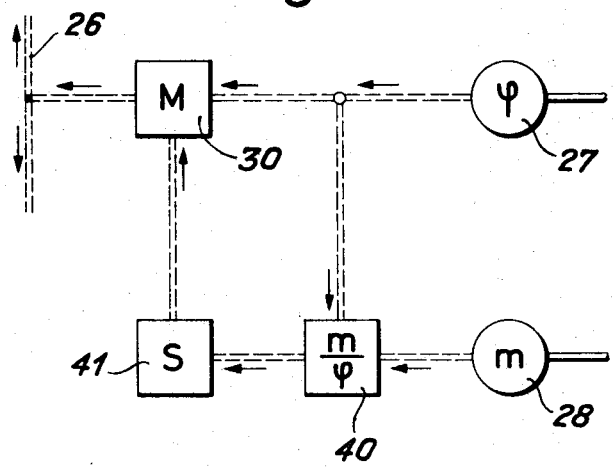
FIG. 2 is a diagrammatic illustration of a modified system.

FIG. 2 illustrates a modification of a part of the arrangement shown in FIG. 1. Corresponding elements are designated by like numerals in FIGS. 1 and 2.

In the embodiment shown in FIG. 2 the signal corresponding to the neutron flux $\varphi$ is conducted to the multiplying device 30 and to a dividing device 40. The latter also receives the signal corresponding to the rate of coolant flow $m$. The dividing device 40 produces a signal corresponding to the quotient $m/\varphi$. The output signal of the dividing device 40 is smoothed in a smoothing device 41, for example by means of a damping element and the smoothed signal is supplied to the multiplying device 30. The output signal of the latter is conducted through the conduit 26 into the aforedescribed controller 22 and the circulating device 14.

I claim.

1. In a nuclear reactor:
 means for determining the instantaneous output of the reactor, for control purposes,
  said means including:
   first means for measuring the neutron flux in the reactor and producing a second signal corresponding to the neutron flux,
   second means for measuring the heat output of the reactor and producing a second signal corresponding to the heat output of the reactor,
  a dividing device operatively connected to said second means and to said first means for dividing said second signal by said first signal to produce an output signal,
  a smoothing device operatively connected to said dividing device for receiving and smoothing said output signal of said dividing device, and a multiplying device operatively conected to said first means and said smoothing device for receiving and multiplying said first signal by said smoothed output signal to produce a signal corresponding to the instantaneous output of the reactor.

2. In a nuclear reactor:
 means for determining the instantaneous output of the reactor for control purposes,
  said means including:
   first means for measuring the neutron flux in the reactor and producing a first signal corresponding to the neutron flux,
   second means for measuring the heat output of the reactor and producing a second signal corresponding to the heat output of the reactor,
  a multiplying device operatively connected to said first means for producing an output signal corresponding to the instantaneous output of the reactor,
  a comparing device operatively connected to said second means and said multiplying device for comparing said output signal and said second signal to produce a fourth signal, and
  an integrating device operatively conected to said comparing device and said multiplying device for receiving and integrating said fourth signal and for supplying said integrated fourth signal to said multiplying device for multiplication of said first signal by said integrated fourth signal to produce said output signal.

3. In a nuclear reactor:
 means for circulating a coolant through the reactor and including means for regulating the rate of coolant flow through the reactor,
 means for measuring the temperature of the coolant leaving the reactor and operatively connected to said regulating means for actuating the latter to maintain said temperature at a predetermined value,
 means for measuring the neutron flux in the reactor for producing a first signal corresponding to the neutron flux,
 means for measuring the rate of coolant flow through the reactor for producing a second signal corresponding to the heat output of the reactor,
 a multiplying device operatively connected to said two last mentioned means for producing an output signal corresponding to the instantaneous output of the reactor,
 a comparing device operatively connected to said means for measuring the rate of coolant flow and to said multiplying device for comparing said output signal and said second signal to produce a fourth signal, and
 means operatively connected between said comparing device and said multiplying device for transmitting said fourth signal to said multiplying device for multiplication of said first signal by said fourth signal to produce said output signal.

4. In a nuclear reactor as set forth in claim 3 wherein said means for transmitting said fourth signal includes an integrating device for integrating said fourth signal.

5. In a nuclear device as set forth in claim 3 which further comprises a delaying device operatively connected between said multiplying device and said comparing device to retard the effect of disturbances in the neutron flux on said output signal.

References Cited

UNITED STATES PATENTS 2,988,494   6/1961   Nye _____ 176—20

FOREIGN PATENTS 887,392   1/1962   Great Britain.
632,488   10/1963   Belgium.
1,370,932   7/1964   France.

CARL D. QUARFORTH, *Primary Examiner.*

L. DEWAYNE RUTLEDGE, *Examiner.*

H. E. BEHREND, *Assistant Examiner.*

UNITED STATES PATENT OFFICE
CERTIFICATE OF CORRECTION

Patent No. 3,356,577                      December 5, 1967

Ygal Fishman

It is hereby certified that error appears in the above numbered patent requiring correction and that the said Letters Patent should read as corrected below.

Column 2, line 49, for "multiplaction" read -- multiplication --; column 3, line 31, for "second" read -- first --.

Signed and sealed this 14th day of January 1969.

(SEAL)
Attest:

Edward M. Fletcher, Jr.                     EDWARD J. BRENNER
Attesting Officer                            Commissioner of Patents